United States Patent
Tell

(10) Patent No.: US 6,612,633 B1
(45) Date of Patent: Sep. 2, 2003

(54) DOUBLE BELLOWS VACUUM OPERATED LIFTING APPARATUS

(75) Inventor: Peter Tell, Åkersberga (SE)

(73) Assignee: Piab AB, Taby (SE)

( * ) Notice: Subject to any disclaimer, the term of this patent is extended or adjusted under 35 U.S.C. 154(b) by 0 days.

(21) Appl. No.: 09/959,740

(22) PCT Filed: Mar. 14, 2000

(86) PCT No.: PCT/SE00/00501
§ 371 (c)(1),
(2), (4) Date: Nov. 5, 2001

(87) PCT Pub. No.: WO00/66481
PCT Pub. Date: Nov. 9, 2000

(30) Foreign Application Priority Data

May 4, 1999 (SE) .................................................. 9901611

(51) Int. Cl.⁷ .................................................. B66C 1/02
(52) U.S. Cl. ........................................ 294/64.1; 294/88
(58) Field of Search ........................ 294/88, 64.1, 64.2, 294/64.3, 65; 271/103, 183, 105, 106; 269/21; 414/737, 797, 627

(56) References Cited

U.S. PATENT DOCUMENTS

| | | | | |
|---|---|---|---|---|
| 3,834,558 A | * | 9/1974 | Bru | 294/64.1 |
| 3,884,238 A | * | 5/1975 | O'Malley et al. | 606/107 |
| 4,266,905 A | * | 5/1981 | Birk et al. | 294/64.1 |
| 4,529,353 A | * | 7/1985 | Dean et al. | 294/64.1 |
| 4,534,549 A | * | 8/1985 | Eberle | 271/103 |
| 4,558,755 A | * | 12/1985 | Lundin | 294/64.1 |
| 4,651,396 A | * | 3/1987 | Kerlidou | 294/64.1 |
| 4,728,093 A | * | 3/1988 | Eberle | 271/103 |
| 4,749,219 A | * | 6/1988 | Bolle et al. | 294/64.1 |
| 4,784,380 A | * | 11/1988 | Eberle | 271/103 |
| 5,033,730 A | * | 7/1991 | Davies et al. | 294/64.1 |

FOREIGN PATENT DOCUMENTS

| | | | | |
|---|---|---|---|---|
| EP | 0136993 | * | 4/1985 | 901/40 |
| EP | 0309061 | * | 3/1999 | 294/64.1 |
| JP | 359137636 | * | 8/1984 | 267/122 |
| JP | 406072612 | * | 3/1994 | 271/183 |
| JP | 2000145690 | * | 5/2000 | |
| SU | 0510365 | * | 5/1976 | 901/40 |
| SU | 1446082 | * | 2/1988 | 294/64.1 |
| SU | 143423 | * | 11/1988 | 294/64.1 |

* cited by examiner

Primary Examiner—Eileen D. Lillis
Assistant Examiner—Paul T. Chin
(74) Attorney, Agent, or Firm—Young & Thompson

(57) ABSTRACT

A vacuum operated lifting apparatus includes a piston having a pressure side and a suction side, respectively, and being movably received in a cylinder, wherein a piston shaft projects through a bottom of the cylinder from the pressure side of the piston and having a through passage for connecting the piston pressure side with the atmosphere. An axially compressible space is connected to a vacuum source for evacuation of the chamber and sealed in air-tight attachment to the piston suction side, the space being confined within the wall of a flexible bellows.

9 Claims, 1 Drawing Sheet

DOUBLE BELLOWS VACUUM OPERATED LIFTING APPARATUS

TECHNICAL FIELD OF INVENTION

The present invention relates to a lifting apparatus operated by negative pressure, and by which articles may be gripped and lifted to be displaced and transferred to a new position. Specifically, the invention relates to a vacuum operated lifting apparatus that is designed to have durable operation also in polluted or dusty environments.

As used herein, the term "vacuum operated" refers to a lifting apparatus that is operated by negative pressure, such that a pressure difference between a piston pressure side and a piston suction side causes a movement in the piston, that is utilized for lifting purposes. The word vacuum is therefore to be understood as including also other conditions than conditions, completely free of pressure.

Lifting apparatus as mentioned above are known per se in process industry and used for shifting articles between work stations or process steps, e.g. In many such industries, such as the engineering industry, graphic or chemical industries, high demands are raised in aspects of durability also in harsh operational conditions. These conditions may include oil or grease, frequently combined with dust, grindings and fibers, that may intrude between slide surfaces and ports, thus reducing the operational capacity of the lifting apparatus.

OBJECT OF INVENTION

The object of the present invention is to provide a vacuum operated lifting apparatus that is designed for reliable service and durable function also in harsh operational conditions.

By the way this object will be met by the invention, there is also provided a vacuum operated lifting apparatus having great versatility in implementation, and by which installation is facilitated.

SUMMARY OF THE INVENTION

In the present invention there is suggested a lifting apparatus comprising a cylinder, wherein a moving piston has a pressure side and a suction side. A piston shaft runs through a bottom of the cylinder and has a passage that connects the piston pressure side to the atmosphere. In accordance with the invention, the piston suction side defines a chamber that is connected to a vacuum source. Said chamber is designed to be evacuated from air and is axially compressible. In radial directions, the chamber is defined between the walls of flexible bellows, that are arranged concentrically about the piston shaft.

DRAWINGS

The invention is more fully described below, reference being made to the attached drawings. In the drawings.

DETAILED DESCRIPTION

Figure 3:
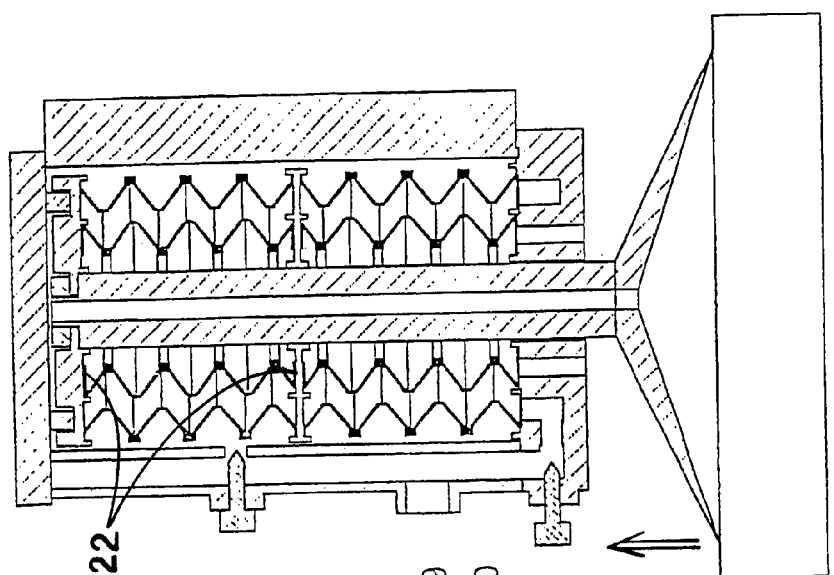
FIG. 3 is a similar section showing the piston shaft under extraction for a lifting sequence.

By reference to the drawings, an embodiment of the inventive lifting apparatus is shown diagrammatically.

A cylinder has a surrounding wall 1, enclosing a cylinder space that is axially defined by a top plane 2 and a bottom 3, respectively. An evacuation chamber 4 is connected to a vacuum source through a discharge opening 5, and a passage 6 connects the inner space of the cylinder to the evacuation chamber 4. A piston shaft 7 is received in the cylinder and runs through the cylinder bottom 3 to be extendable and retractable, respectively. A piston 8 is attached in an inner end of the piston shaft 7 and caused to move as a result of a difference in pressure, generated by the vacuum source, and acting on the top face or bottom face, or the pressure side and suction side, respectively, of the piston. A grip means, such as a suction cup for holding an article, is attached in the outer end of the piston shaft 7. A passage 9 runs axially through the piston shaft 7 to open in the top face of the piston 8, thereby connecting the cylinder space above the piston top face to atmospheric pressure. A ring shaped seal, not further disclosed, may be received in the top face of the piston for dampening the piston motion in the extracted, extreme end position.

Figure 1:
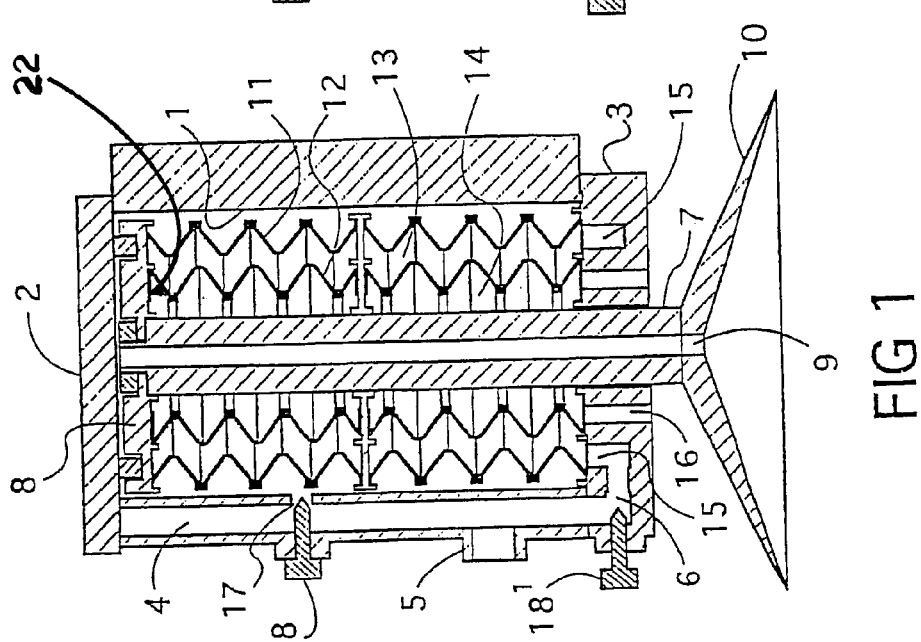
FIG. 1 is a longitudinal section through the lifting apparatus in a rest position.

In accordance with the present invention, the bottom face of the piston 8 rests on upper ends of two bellows 11,12, the bellows being supported on the bottom plane 3 of the cylinder. Said bellows 11,12 are flexible to be axially compressible, and may thus be produced from rubber or synthetic material, or a composition material including rubber and synthetics. By their construction and choice of material, the bellows 11,12 are urged to the extended position shown in FIG. 1.

The bellows 11,12 extend concentrically about the piston shaft 7, such that an outer and an inner annular space 13 and 14, respectively, is defined within the bellows 11,12. The outer annular space 13 is connected to the vacuum source through an annular passage 15, opening in the upper face of the cylinder bottom 3. The inner annular space 14 is connected to the atmosphere via one or more axial through holes 16, passing through the cylinder bottom 3.

Figure 2:
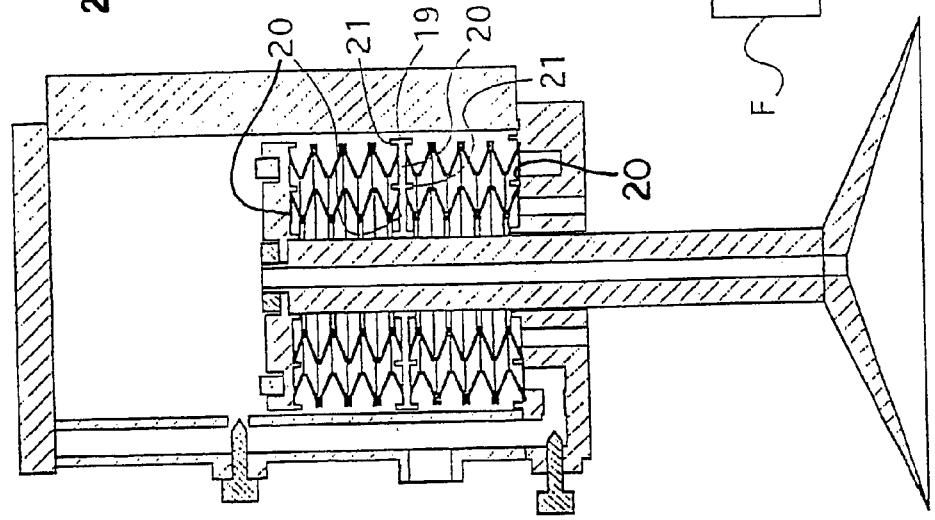
FIG. 2 is a section similar to FIG. 1, showing the lifting apparatus in operative position when the piston shaft is extended.

When activating the vacuum source, see FIG. 2, a negative pressure is produced in the outer annular space 13, that acts on a radially outer area of the piston suction face, whereas atmospheric pressure acts on the whole area of piston pressure face. While compressing the bellows 11, 12, the piston 8 together with piston shaft 7 are thus driven outwards until the passage 9 of the piston shaft is closed, when the suction cup 10 contacts a surface of an article F (see FIG. 3). As atmospheric pressure no longer is admitted into the cylinder space above the piston 8, the pressure difference between the piston pressure side and the piston suction side is gradually vanishing. This is secured by a passage 17 connecting the cylinder space and the evacuation chamber 4, the latter preferably being extended substantially the whole axial length of the cylinder.

Concurrently, atmospheric pressure acts on the inner annular space 14, which is connected to the atmosphere via through holes 16. Thus, the piston suction face is exposed to a pressure that gradually exceeds the pressure acting on the pressure side of the piston. Accordingly, the piston 8, piston shaft 7 and the gripped article are lifted upwards as illustrated by the arrow of FIG. 3.

In one alternative embodiment, one or several load springs may be arranged inside the bellows for providing added lift capacity thereof, when lifting heavy articles. Reinforcing ring elements may likewise be internally arranged in the bellows 11,12 to provide them more stiffness.

In another embodiment, a set screw 18 may be arranged to provide an adjustable restriction of the passage 17 in order to adjust the speed of extension and retraction, respectively, of the piston shaft 7.

In yet another embodiment, a set screw 18' may likewise be arranged in the passage 6 for restricting the connection between the evacuation chamber 4 and the annular groove 15, in order to adjust the speed of extension and retraction, respectively, of the piston shaft 7.

In a second aspect of the invention, a transverse and horizontal partition wall 19 may be arranged to separate bellows 11 and 12, arranged on top of each other. Said partition 19 forms an annular connection member 19 for a modular configuration of the lifting apparatus to a desired length or height, and comprises a central through hole for the piston shaft 7 as well as openings (not shown) for axial flow connection between spaces, enclosed by the bellows 11,12.

Annular recesses 20 are formed in the lower face of the piston 8, as well as in the upper face of cylinder bottom 3 and on both faces of the connection member 19 for receiving the ends of the bellows. Each annular recess 20 has a peripheral wall 21 running in the axial direction, so that the ends of the bellows 11,12 are radially supported by the wall. At least the ends of the inner bellows 12 may be formed to have a supporting shoulder 22 extended in radial direction, resting in the bottom of the recess 20. Said shoulder 22 prevents air from leaking out from the annular spaces 13,14 during operation of the vacuum source.

A vacuum operated lifting apparatus as shown schematically in this embodiment provides good operating capacity also in harsh environments. The guidance of the piston shaft 7 through the cylinder bottom 3 may include a certain clearance to make the lifting apparatus less sensitive to particles and dirt. Impurities, which may enter the space within the inner bellows 12 via the through holes 16 will not be able to effect the operation, and the piston 8 may likewise be provided a clearance from the cylinder wall. Hence, the lifting apparatus of the invention is substantially insensitive to problems related to frictional wear, and will meet high demands on operation also in polluted or otherwise harsh locations.

What is claimed is:

1. A vacuum operated lifting apparatus, comprising:
   a piston movably received within a surrounding wall of a cylinder, said cylinder having a top plane and a bottom plane;
   a shaft having an outer end with a suction cup attached thereto and an inner end carrying said piston, said shaft having an axial passage that opens in a top face of said piston and communicates atmospheric pressure to said top face of said piston, said shaft projecting through said cylinder bottom plane so as to be extendable in response to a negative pressure applied to a bottom face of said piston and retractable in response to a negative pressure applied to said top face of said piston as said axial passage is closed by an article placed in sealing contact with said suction cup; and
   two axially compressible bellows arranged in concentric relation between said surrounding wall of said cylinder and said shaft, said two bellows extending from said cylinder bottom plane to support said bottom face of said piston, said two bellows defining two annular spaces radially about said shaft, one of said annular spaces communicating atmospheric pressure to said bottom face of said piston and another of said annular spaces communicating negative pressure to said bottom face of said piston.

2. The apparatus of claim 1, wherein said two bellows are flexible and compressed against an inherent bias when negative pressure is applied to said bottom face of said piston.

3. The apparatus of claim 2, wherein said another annular space is formed between said two bellows and communicates negative pressure to said bottom face of said piston via an evacuation chamber that is connected to a vacuum source, and wherein said one annular space is formed between an interior one of said two bellows and said shaft and communicates atmospheric pressure to said bottom face of said piston via through-holes formed in said cylinder bottom plane.

4. The apparatus of claim 3, wherein atmospheric pressure is evacuated from said cylinder via said evacuation chamber.

5. The apparatus of claim 4, wherein said evacuation chamber communicates with an interior of said cylinder and with said another annular space via passages having adjustable restrictions.

6. A vacuum operated lifting apparatus, comprising:
   a cylinder having an interior wall, a bottom with an air hole therein, and a top;
   a piston axially movable along said interior wall of said cylinder;
   a piston shaft carrying said piston at one end and a suction cup at another end, said piston shaft having a passage therethrough that connects an interior of said cylinder to an interior of said suction cup;
   two flexible bellows inside said cylinder and arranged concentrically around said piston shaft, an interior one of said two bellows defining a first space between said interior bellows and said piston shaft that communicates with ambient pressure through said air hole, each of said two bellows having one end attached to said piston and an opposite end attached to said bottom of said cylinder so that said two bellows are compressed when said piston moves toward said bottom of said cylinder;
   an evacuation chamber in communication with a second space between said two bellows and with a third space between said top of said cylinder and said piston when said two bellows are compressed, said evacuation chamber being arranged and adapted to communicate less than ambient pressure to said second and third spaces.

7. The apparatus of claim 6, wherein said evacuation chamber communicates with said second space through a passage in said bottom of said cylinder.

8. The apparatus of claim 6, wherein said evacuation chamber is within said interior wall and extends from said bottom of said cylinder to said top of said cylinder.

9. The apparatus of claim 6, wherein a diameter of said interior wall is constant from said bottom of said cylinder to said top of said cylinder.

\* \* \* \* \*